UNITED STATES PATENT OFFICE.

FRIEDRICH von HOLT, OF GEORGSMARIENHÜTTE, NEAR OSNABRÜCK, GERMANY.

PROCESS OF PRODUCING AN IRON ALLOY RICH IN PHOSPHORUS FROM INFERIOR FINERY-SLAG.

1,196,185.　　　　　Specification of Letters Patent.　　Patented Aug. 29, 1916.

No Drawing.　　　Application filed June 26, 1916. Serial No. 105,935.

*To all whom it may concern:*

Be it known that I, FRIEDRICH VON HOLT, a citizen of Germany, residing at Georgsmarienhütte, near Osnabrück, in the German Empire, have invented certain new and useful Improvements in Processes of Producing an Iron Alloy Rich in Phosphorus from Inferior Finery-Slag, of which the following is a specification.

My present invention relates to the obtainment of a comparatively valuable commercial product from a matter or an article for which hitherto no sufficiently profitable utilization has been discovered.

My invention relates in particular to a novel way of utilizing the slag formed in the refining furnace, for instance, in a finery hearth, or a converter, and which has hitherto been considered almost valueless. When a part of such slag, on account of its iron or manganese contents, is resmelted in the blast furnace, its phosphorus contents are sure to result in an impure blast furnace product, especially so when quality grades of pig iron a good quantity are sought. A utilization of the phosphorus of the open hearth slag has hitherto been feasible only if the amount of phosphorus therein was high enough to conform to the prescriptions for powdered phosphate.

It is the object of my present invention to provide a process according to which a valuable commercial product may be cheaply obtained from such a medium slag which may contain from one to six per cent. of phosphorus hitherto considered almost valueless.

My process consists in producing by means of this slag an iron-alloy rich in phosphorus by adding the phosphatic slag to the charge of an existing gas-generator in which coal is subjected to oxidation until an ash is left, as is customary. In the generator the heat causes the basic constituents of the said phosphatic slag to combine with the silicates of the ash constituents of the coal, while the phosphorus forms with the iron the desired ferro-phosphorus. The operation of the generator is not unfavorably influenced by this process which is carried out as a by-manufacture furnishing a readily salable product.

If the slag is manganiferous as will frequently be the case, the resulting product of the novel process will be a specular iron rich in phosphorus which can be used in the smelting of steel in substitution of the usual additions, whereby the steel is simultaneously imparted the required amount of manganese and phosphorus.

It has been proposed to produce liquid iron in the gas generator. However, it is the object of my present invention to provide a process for the manufacture of a commercial article from an inferior slag containing a medium amount of phosphorus.

What I claim as my invention and desire to secure by Letters Patent of the United States, is:

1. A method of producing an iron alloy containing phosphorus from a slag, containing from one to six per cent. of phosphorus, by heating the said slag together with the charge of coal in a gas generator, the temperature being sufficiently high to cause the basic constituents of the slag to combine with the silicates of the ash of the coal.

2. A process of producing iron alloy from a slag containing phosphorus, which consists in mixing the said slag together with coal, and subjecting the coal to oxidation, the temperature being sufficiently high to cause the basic constituents of the said slag to combine with the ash of the coal.

3. A process of producing a specular iron from a slag containing manganese and phosphorus, which consists in mixing the slag with coal, and subjecting the coal to oxidation, the temperature being sufficiently high to cause the basic constituents of the slag to combine with the silicates of the ash of the coal.

4. A method of producing an iron alloy rich in phosphorus from a slag containing phosphorus, which consists in causing the basic constituents of the slag to combine with silicates under the action of heat, the temperature being sufficiently high to cause the resmelting of the said silicates.

5. A method of producing a specular iron from a slag containing manganese and phosphorus which consists in causing the basic constituents of the said slag to combine with silicates under the influence of heat, the temperature being sufficiently high to cause the re-smelting of the said silicates.

In testimony, that I claim the foregoing as my invention, I have signed my name in presence of two subscribing witnesses.

FRIEDRICH von HOLT.

Witnesses:
 FREDERICK HOYERMANN,
 GEORGE LIERNUR.